US012180860B2

(12) United States Patent
Congratel et al.

(10) Patent No.: US 12,180,860 B2
(45) Date of Patent: Dec. 31, 2024

(54) GUIDE VANES ASSEMBLY WITH POSITION-MAINTAINING DEVICE (71) Applicants: SAFRAN AIRCRAFT ENGINES, Paris (FR); SAFRAN CERAMICS, Le Haillan (FR)

(72) Inventors: Sébastien Serge Francis Congratel, Moissy-Cramayel (FR); Aurélien Gaillard, Moissy-Cramayel (FR); Matthieu Arnaud Gimat, Moissy-Cramayel (FR); Clément Jarrossay, Moissy-Cramayel (FR); David René Pierre Le Cair, Moissy-Cramayel (FR)

(73) Assignees: SAFRAN AIRCRAFT ENGINES, Paris (FR); SAFRAN CERAMICS, Le Haillan (FR)

( * ) Notice: Subject to any disclaimer, the term of this patent is extended or adjusted under 35 U.S.C. 154(b) by 0 days.

(21) Appl. No.: 18/546,169

(22) PCT Filed: Feb. 8, 2022

(86) PCT No.: PCT/FR2022/050230
§ 371 (c)(1),
(2) Date: Aug. 11, 2023

(87) PCT Pub. No.: WO2022/171955
PCT Pub. Date: Aug. 18, 2022

(65) Prior Publication Data
US 2024/0133306 A1 Apr. 25, 2024
US 2024/0229662 A9 Jul. 11, 2024

(30) Foreign Application Priority Data
Feb. 12, 2021 (FR) .................... 21 01366

(51) Int. Cl.
*F01D 9/04* (2006.01)

(52) U.S. Cl.
CPC ............. *F01D 9/042* (2013.01); *F01D 9/041* (2013.01); *F05D 2250/71* (2013.01); *F05D 2260/38* (2013.01); *F05D 2300/6033* (2013.01)

(58) Field of Classification Search
CPC ............... F01D 9/042; F05D 2240/128; F05D 2250/71; F05D 2260/38
See application file for complete search history.

(56) References Cited

U.S. PATENT DOCUMENTS 5,346,362 A * 9/1994 Bonner .................. F01D 25/04
415/209.1
5,601,407 A * 2/1997 Humhauser ........... F01D 25/246
415/209.2
(Continued)

FOREIGN PATENT DOCUMENTS

EP 2 481 888 A2 8/2012
EP 2 481 888 A3 8/2012
(Continued)

OTHER PUBLICATIONS

International Search Report issued Apr. 13, 2022 in PCT/FR2022/050230, filed on Feb. 8, 2022, 2 pages.
(Continued)

*Primary Examiner* — Courtney D Heinle
*Assistant Examiner* — Danielle M. Christensen
(74) *Attorney, Agent, or Firm* — Oblon, McClelland, Maier & Neustadt, L.L.P.

(57) ABSTRACT

A turbine engine nozzle extending about an axis and including a vane assembly mounted between an outer shroud and an inner shroud; and a position retaining device configured to be placed in an elastically prestressed state between the inner shroud and an inner platform of the vane assembly to apply a stress on the vane assembly towards the outer shroud. The contact between the inner shroud and the inner
(Continued)

platform is obtained by one same surface of the position retaining device.

14 Claims, 9 Drawing Sheets

(56) References Cited

U.S. PATENT DOCUMENTS

| | | | |
|---|---|---|---|
| 7,291,946 B2* | 11/2007 | Clouse | F01D 11/08 415/119 |
| 2008/0279679 A1 | 11/2008 | Morrison | |
| 2011/0135479 A1 | 6/2011 | Ueda et al. | |
| 2019/0249570 A1 | 8/2019 | Barua et al. | |

FOREIGN PATENT DOCUMENTS

| EP | 3 214 276 A1 | 9/2017 |
|---|---|---|
| GB | 2 456 770 A | 7/2009 |
| WO | WO 2015/157751 A1 | 10/2015 |
| WO | WO 2015/157751 A8 | 10/2015 |

OTHER PUBLICATIONS

French Prelimnary Search Report issued Aug. 11, 2021 in FR 21 01366, filed on Feb. 12, 2021, 3 pages (with English Translation of Categories of Cited Documents).

* cited by examiner

GUIDE VANES ASSEMBLY WITH POSITION-MAINTAINING DEVICE

TECHNICAL FIELD

The invention relates to turbine engines, in particular turbine aeroengines or industrial turbines comprising a nozzle having a vane assembly in ceramic matrix composite.

PRIOR ART

A ceramic matrix composite material, hereinafter designated by the expression «CMC material» or «CMC», generally comprises a fibre reinforcement within a matrix that is at least partly ceramic.

Ever increasing operating temperatures are used in turbine engines to improve the performance and to reduce the polluting emissions thereof.

For this purpose, the choice of materials for the hottest parts of turbine engines has focused on CMCs.

CMC materials have excellent mechanical properties at high temperature, and low densities allowing turbines to be made more lightweight.

In particular, the use of CMC materials for turbine nozzles has been proposed for example in French patent application FR 3061928.

The integration in a turbine nozzle of a part in CMC is complicated however within a metal environment, on account of differences in thermal expansions.

There is therefore a need for a device facilitating the integration and retaining in position of a part in CMC within a turbine engine nozzle.

DESCRIPTION OF THE INVENTION

The present description concerns a turbine engine nozzle extending about an axis and comprising:
- a vane assembly mounted between an outer shroud and an inner shroud,
- a position retaining device configured to be placed in an elastically prestressed state between the inner shroud and an inner platform of the vane assembly, so as to apply a stress on the vane assembly that is oriented towards the outer shroud.

In the present description, the main axis is the main axis of the nozzle and by extension the main axis of the turbine in which the nozzle is to be mounted. The axial direction corresponds to the direction of the main axis, and a radial direction is a direction perpendicular to this axis and crossing this axis. Similarly, an axial plane is a plane containing the main axis, and a radial plane is a plane perpendicular to this axis. A circumference extends as a circle belonging to a radial plane and having a centre belonging to the axis of the nozzle. A tangential or circumferential direction is a direction tangent to a circumference; it is perpendicular to the axis but does not pass through the axis. A circumferential plane is a plane strictly parallel to the axis i.e. not crossing the axis infinitely and not comprising the axis. An extension «at least» in an axial (respectively radial) direction is an extension at least partly in a direction which has a nonzero axial (respectively radial) component.

Unless stated otherwise, the adjectives internal, inner, external and outer are used with reference to a radial direction, so that the internal or inner part of an element in a radial direction is closer to the axis than the external or outer part of the same element.

In the remainder hereof, and unless otherwise stated, by «an» or «the» element (e.g. duct, bearing etc.), it is meant «at least one» or «the at least one» or «each» element. Reciprocally, the generic use of the plural can include the singular. In the remainder hereof and unless otherwise stated, by «a plurality» it is meant «at least two».

By «vane assembly» it is meant an assembly of one or more vanes possibly having, in the context of a turbine nozzle, an aerodynamic function to straighten the flow of working fluid.

In said nozzle, the position retaining device applies a stress in reaction to the elastically prestressed state thereof, allowing the vane assembly to be held flat against the outer shroud whilst limiting forces within the position retaining device.

Said nozzle therefore allows the holding in position of the vane assembly at different operating phases of the turbine and without any significant change in the usual structure of a nozzle.

In some embodiments, the contact between the inner shroud and the inner platform is obtained by one same surface of the position retaining device.

Said position retaining device is of simple structure, facilitating the sizing and integration thereof within the nozzle.

In some embodiments, the surface of the position retaining device can extend continually between the two ends of the position retaining device.

It is to be understood that contacting does not take place at the same positions of the surface of the position retaining device, but at two different positions of one same surface.

In some embodiments, the orientation of an outer surface of the position retaining device varies by more than 180° over the outer surface between the two ends. The outer surface can correspond to the surface of the position retaining device.

In some embodiments, the position retaining device comprises at least one curved metal sheet, preferably two curved metal sheets.

The curved structure of the metal sheet imparts deformability properties similar to those of a spring to the position retaining device, facilitating application of elastic prestressing.

The use of two metal sheets allows the stiffness of the position retaining device to be increased in the direction of application of elastic prestressing. In particular, the use of two metal sheets allows an increase in the prestress level for one same deformation compared with a structure having a single metal sheet.

In some embodiments, the two curved metal sheets have common ends.

Each metal sheet therefore has a first and a second end, the first ends meeting together, the second ends meeting together.

The two curved metal sheets therefore behave in the manner of two parallel springs, the stiffness of each one possibly adding to the other, allowing facilitated sizing thereof by adjusting the level of desired elastic prestress and corresponding deformation level by adjusting the stiffness of the position retaining device.

In some embodiments, one of the two metal sheets interlocks with the other of the two metal sheets.

By «interlocked metal sheets» it is meant metal sheets of common shape and successively lying one within the other.

In some embodiments, the prestress is applied for compression corresponding to displacement of between 0.2 mm and 1 mm, preferably 0.4 mm and 0.8 mm, more preferably of 0.6 mm between a rest state and the elastically prestressed state.

The displacement corresponding to the prestress is measured between the positions corresponding to the respective contact zones of the position retaining device with the inner shroud and with the inner platform of the vane assembly.

Such deformation levels ensure a reaction force on the vane assembly that is sufficient to ensure the holding in position of the vane assembly, whilst affording low risks of damage thereto.

In some embodiments, the prestress is obtained by mounting of the vane assembly on the position retaining device between the outer shroud and the inner shroud.

Said nozzle affords facilitated mounting, thereby reducing risks of damage.

In some embodiments, the vane assembly comprises at least one hollow vane to allow the passing of a radial strut securing the inner shroud to the outer shroud.

The strut provides a function ensuring structural reinforcing of the nozzle. The at least one vane ensures straightening of the gas flow leaving the combustion chamber.

In some embodiments, the at least one vane can be formed on an entire circumferential contour of the nozzle.

In some embodiments, a radial strut can be formed between each profiled element.

In some embodiments the strut can project from the outer shroud and be secured by pin-locking onto the inner shroud. Alternatively, the strut can also project from the inner shroud and be secured by pin-locking onto the outer shroud.

In some embodiments, the inner shroud has a clamping protrusion configured to limit displacement of the position retaining device in an axial direction of the nozzle.

The clamping protrusion ensures good axial positioning of the position retaining device. A nozzle having said position retaining device therefore affords facilitated mounting whilst allowing good application of a stress without the risk of damaging parts.

In some embodiments, the inner shroud has a clamping protrusion configured to limit movement in a circumferential direction of the nozzle.

The clamping protrusion allows maintaining of the circumferential position of the position retaining device. This facilitates contacting between the position retaining device and the inner shroud, and between the position retaining device and the inner platform of the vane assembly. Said position retaining device further allows facilitated mounting.

In some embodiments, the nozzle comprises at least two position retaining devices respectively circumferentially connected and each arranged against at least one vane.

Said structure allows circumferential clamping of the vane assembly. Said structure also facilitates uniform distribution of forces over a circumferential contour of the vane assembly.

The plurality of position retaining devices therefore forms a position retaining ring allowing the facilitated assembly of the position retaining devices, by ensuring assembling of the position retaining ring rather than the successive assembling of each position retaining device. In addition, said structure facilitates heed of co-axiality tolerances.

In some embodiments, the vane assembly is in CMC material.

The present description also concerns a turbine engine comprising a nozzle according to the present description. In particular, the nozzle can be positioned downstream of a combustion chamber.

The present description also concerns an aircraft comprising the turbine engine according to the present description.

DESCRIPTION OF EMBODIMENTS

Figure 1:
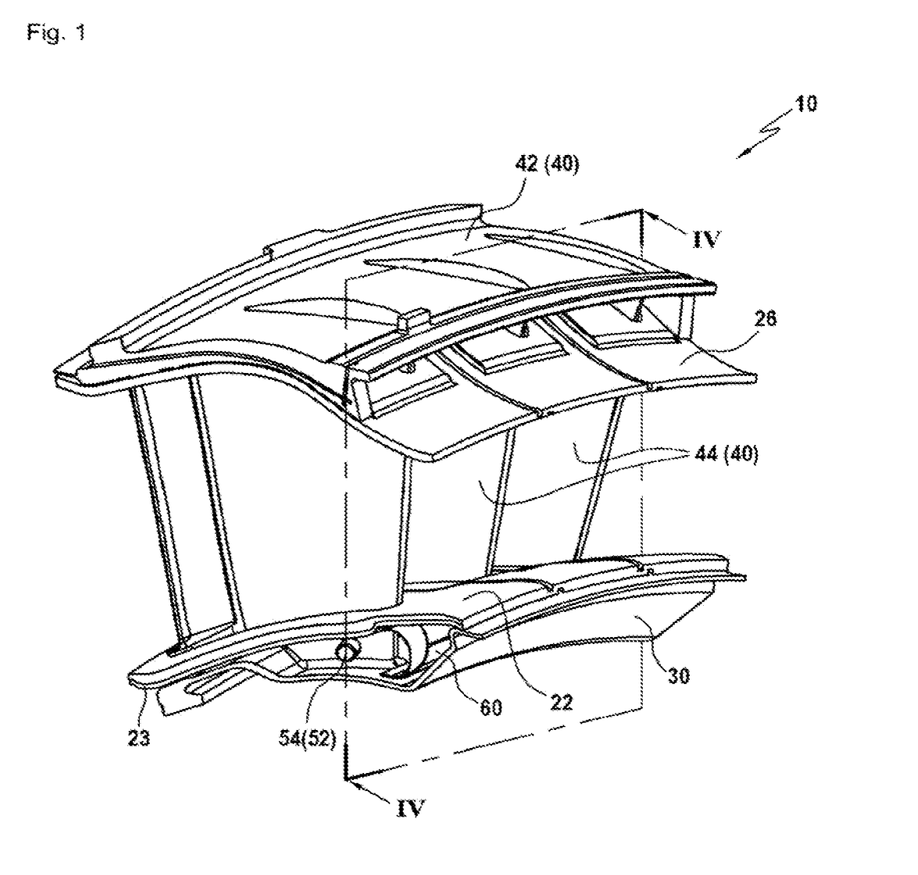
FIG. 1 is a partial schematic view of a turbine nozzle according to the invention.
Figure 2:
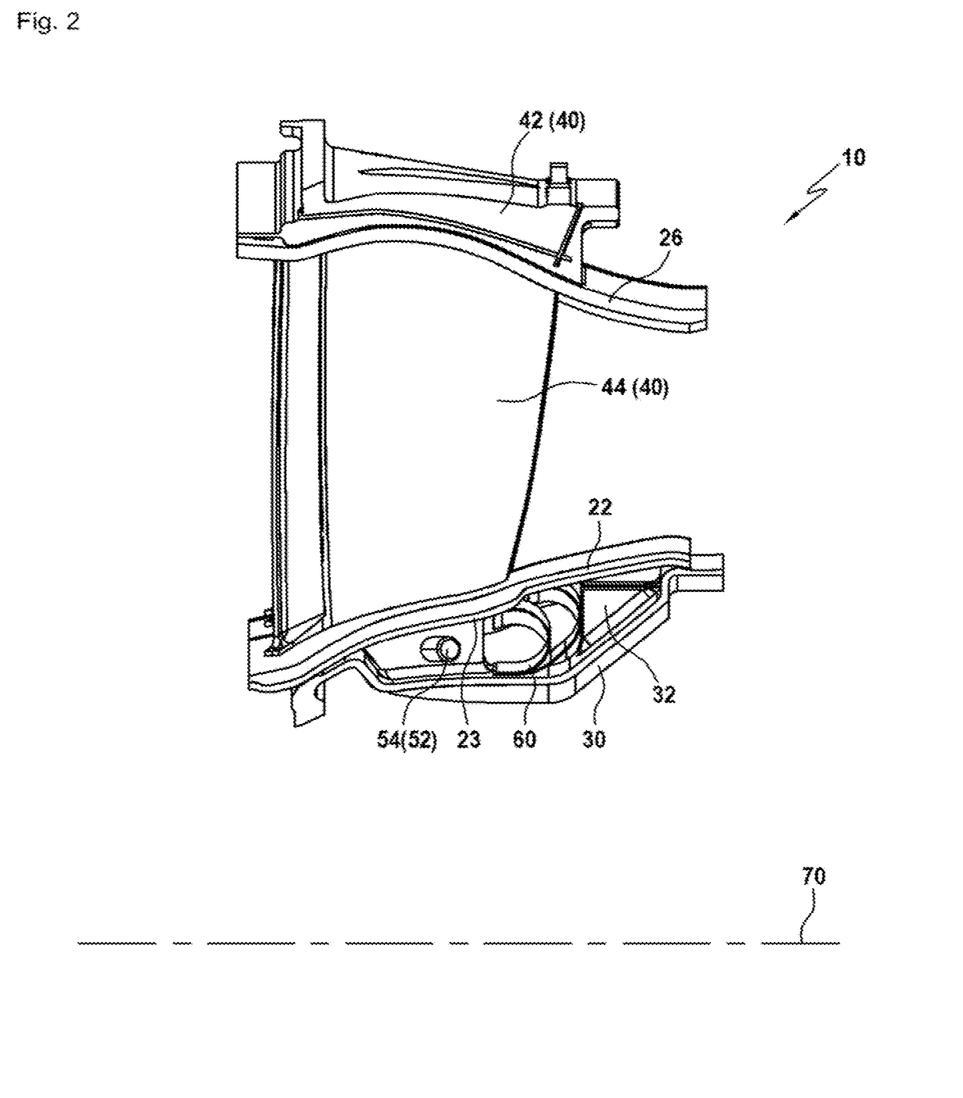
FIG. 2 is a cross-sectional schematic view along an axial plane of a turbine nozzle according to the invention.
Figure 3:
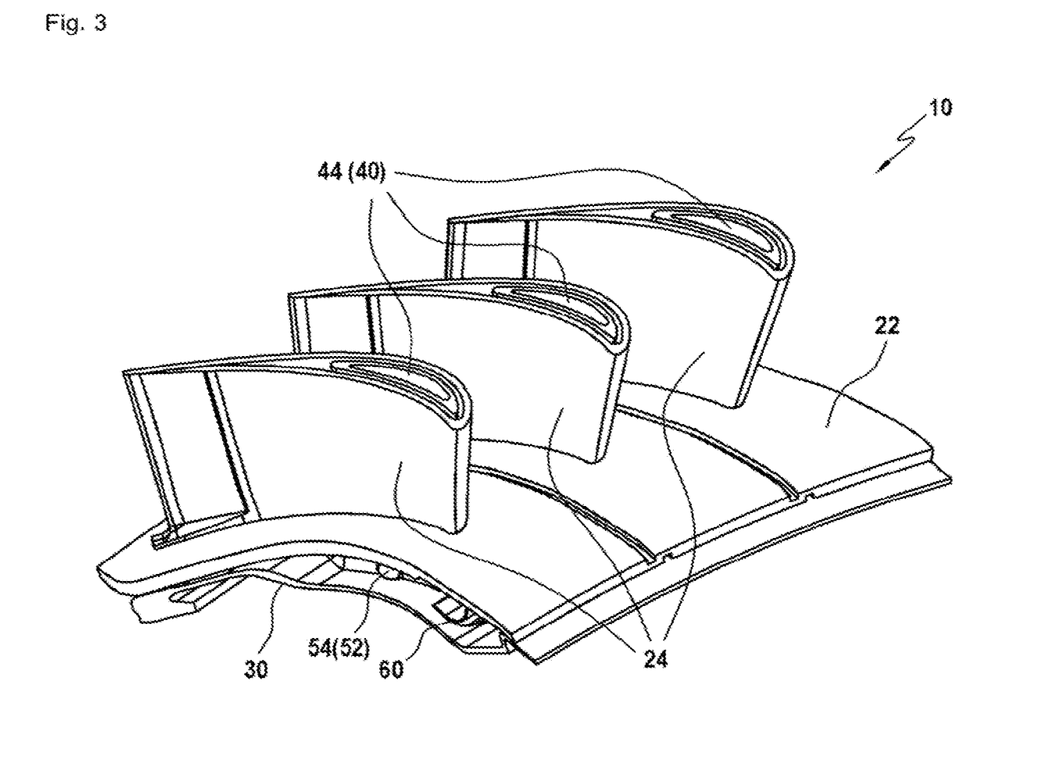
FIG. 3 is a schematic cut-away, perspective view along a circumferential plane of a turbine nozzle according to the invention.
Figure 4:
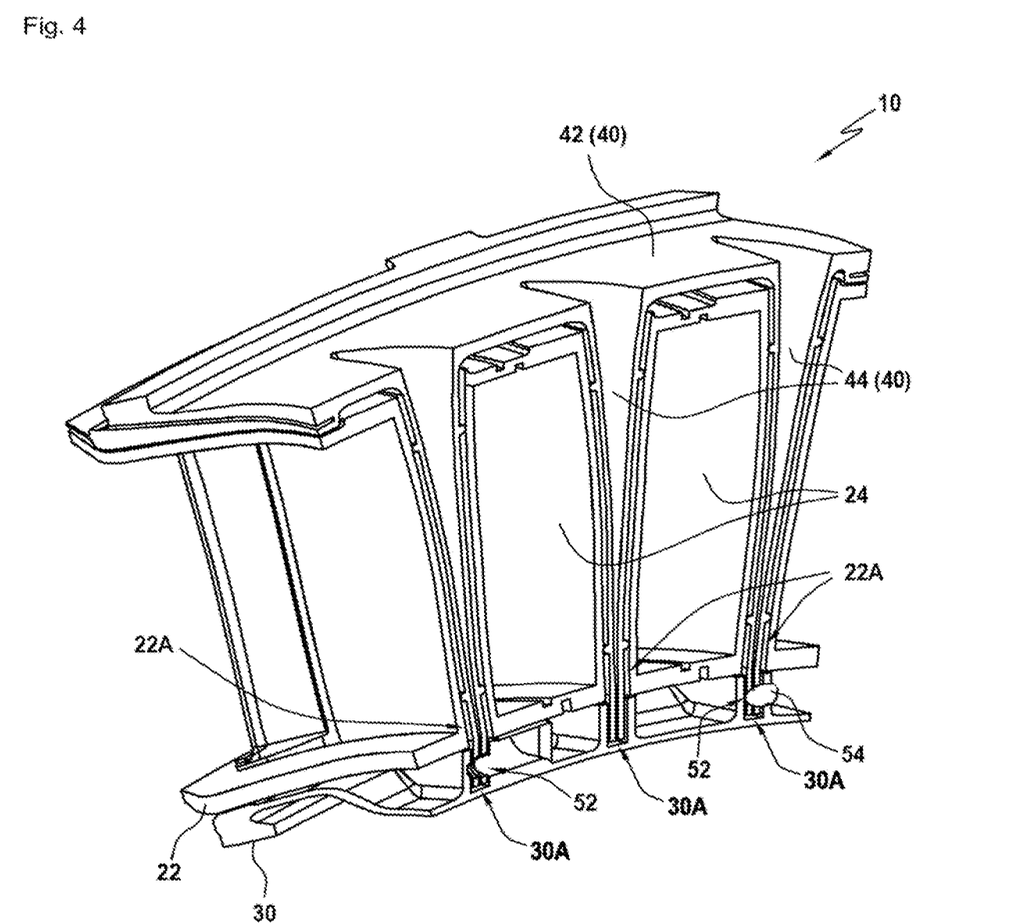
FIG. 4 is a cross-sectional schematic view along a radial plane of a turbine nozzle according to the invention, along sectional plane IV in FIG. 1.

FIGS. 1 and 2 give a partial schematic view and a cross-sectional schematic view respectively along an axial plane of a turbine nozzle 10 according to the invention. FIG. 3 is a cut-away schematic perspective view along a circumferential plane of a turbine nozzle conforming to the invention. FIG. 4 is a cross-sectional schematic view along plane IV in FIG. 1.

In FIGS. 1, 2, 3, 4, 6A and 6B, the nozzle 10 is shown in a partial view, but it is understood that it extends circumferentially about a main axis 70.

The nozzle 10 has an outer shroud 42 and an inner shroud 30. The outer shroud 42 lies at a position radially outside the nozzle 10, and the inner shroud lies at a position radially inside the nozzle 10.

A vane assembly 20 is mounted between the outer shroud 42 and the inner shroud 30. The vane assembly is formed in ceramic matrix composite material.

The outer shroud 42 and the inner shroud 30 are joined together and secured by a radial strut 44, the radial strut 44 ensuring the holding in position of the structure of the nozzle 10.

The outer shroud 42 and the strut 44 are formed together in one piece to form a strut and outer shroud assembly 40. The assembly 40 can then be assembled with the inner shroud 30 so that the strut 44 joins the inner shroud 30 to the outer shroud 42. The strut 44 can then be assembled in the vane assembly 20 to mount the strut and outer shroud assembly 40 in the nozzle 10.

The forming of the strut and outer shroud assembly 40 in one piece can be obtained with an additive manufacturing method, for example by laser beam melting on a powder bed.

The nozzle 10 may comprise a plurality of struts 44 arranged on a circumferential contour of the nozzle 10. The plurality of struts 44 is arranged regularly along a circumferential contour of the nozzle 10.

The vane assembly 20 has an outer platform 26 at a radially external position of the vane assembly 20. The vane assembly 20 has an inner platform 22 at a radially internal position of the vane assembly 20.

The vane assembly 20 comprises one or more vanes 24.

The vanes 24 allow straightening of a gas stream, in particular a stream of combustion gas derived from a combustion chamber of the turbine. For reasons of visibility of the inner parts of the nozzle 10, the vanes 24 are not illustrated in FIGS. 1 and 2, and are shown in cross-section in FIGS. 3, 4, 6A and 6B.

These vanes 24 extend radially between the inner platform 22 and the outer shroud 42.

The vanes 24 are innerly and radially delimited by the inner platform 22, and externally and radially by an outer platform 26.

Thermal cowling 23 can be positioned against a radially inner surface of the inner platform 22. The thermal cowling 23 provides thermal protection for the radial inner elements of the nozzle against the hot fluid flowing through the nozzle.

As illustrated in the view in FIG. 3, the vane assembly 20 is hollow to allow the passing of a radial strut 44. In particular the vanes 24 are hollow. These vanes 24 allow improved aerodynamism of the nozzle 10, while the radial strut 44 allows reinforcing of the structure of the nozzle 10.

The strut 44 is inserted in an opening 22A provided in the inner shroud 22A.

As illustrated in the cross-sectional view in FIG. 4, the strut 44 extends through an opening 22A of the inner platform 22 and is inserted in an orifice 30A of the inner shroud 30.

The radial strut 44 can be secured to the inner shroud 30 by pin locking. For example, the strut can be inserted in the orifice 30A provided in the inner shroud 30. The orifice 30A can be in the form of a blind hole or notch. A contour of the orifice 30A projects to form a protrusion surrounding the strut 44. The protrusion around the orifice 30A of the inner shroud 30, and the radial strut 44, each have orifices 52, and the connection between the protrusion and the radial strut 44 is obtained by inserting a pin 54 through the orifices 52 of the protrusion surrounding orifice 30A and of the radial strut 44.

In the view in FIG. 4, different configurations of strut 44 are illustrated with or without orifice 52, with or without pin 54 for illustrative purposes. It will be understood that all or some of the struts 44 can have an orifice 52, and that this orifice 52 is provided for the insertion of a pin 54.

A position retaining device 60 is arranged between the inner shroud 30 and the inner platform 22 of the vane assembly 20.

In particular, in the embodiment in FIGS. 1 and 2, the inner shroud 30 and the inner platform 22 of the vane assembly 20 have surfaces having an extension substantially in the axial direction as seen in an axial plane, in particular in the cross-sectional view along the axial plane in FIG. 2.

Therefore, the position retaining device 60 extends in a substantially radial direction between the inner shroud 30 and the inner platform 22 of the vane assembly 20.

As illustrated in FIGS. 1 and 2, the thermal cowling 23 is positioned between the position retaining device 60 and the inner platform 22, forming an intermediate part allowing improved distribution of forces between the position retaining device 60 and the inner platform 22. The thermal cowling 23 may be omitted and the position retaining device 60 can be positioned directly between and in contact with the inner platform 22 and the shroud 30. For this reason, the thermal cowling 23 is not illustrated in the view in FIGS. 3, 4, 6A and 6B.

Figure 5A:
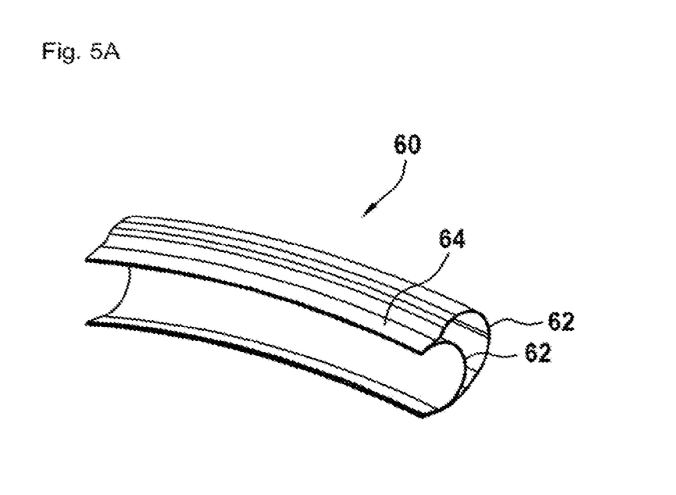
FIG. 5A is a schematic view of a position retaining device according to the invention.
Figure 5B:
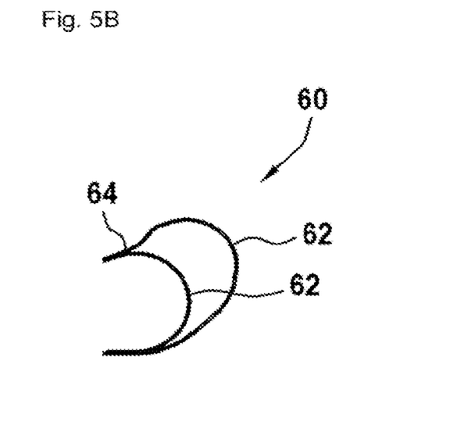
FIG. 5B is a schematic view of a cross-section of a position retaining device according to the invention.

FIG. 5A gives a schematic view of the position retaining device 60, and FIG. 5B gives a cross-sectional view of the position retaining device 60.

In the embodiment in FIGS. 5A and 5B, the position retaining device 60 is formed of an assembly of two metal sheets 62 each having a curved shape.

The two metal sheets 62 meet together via two respective ends at two common ends.

The two metal sheets 62 have an interlocked structure i.e. a first sheet 62 is in interlocked in a second metal sheet 62.

One from among the two common ends of the two metal sheets 62 corresponds to a contact zone 64 between the position retaining device 60 and the inner platform 22 of the vane assembly 20, when the position retaining device 60 is mounted in the nozzle 10.

The other from among the two common ends of the two metal sheets 62 corresponds to a contact zone between the position retaining device 60 and the inner shroud 30, when the position retaining device 60 is mounted in the nozzle 10.

The contact zone 64 between the position retaining device 60 and the inner platform 22 of the vane assembly 20, and the contact zone between the position retaining device 60 and the inner shroud 30 are formed on one same curved surface of a metal sheet 62, called first surface.

Since the first surface is curved, the normal to the first surface is of variable orientation. In particular, the orientation of the first surface can vary by more than 180° over the first surface between the end thereof corresponding to the contact zone 64 between the position retaining device 60 and the inner platform 22 of the vane assembly 20, and the end thereof corresponding to the contact zone between the position retaining device 60 and the inner shroud 30.

The position retaining device 60 is designed to be placed in an elastically prestressed state between the inner shroud 30 and the inner platform 22 of the vane assembly 20.

Said elastically prestressed state corresponds for example to a stress applied in a direction connecting the two contact zones of the position retaining device 60, the resulting deformation causing these two contact zones to be drawn towards each other.

Said elastically prestressed state can be obtained by applying a strain corresponding to displacement of between 0.2 mm and 1 mm, preferably between 0.4 mm and 0.8 mm, more preferably of 0.6 mm between a rest or non-stressed state and the elastically prestressed state.

In particular, the application of a prestress corresponding to the prestressed state can be obtained by mounting the vane assembly 20 between the outer shroud 42 and the inner shroud 30 and position retaining device 60. This mounting is performed when the outer shroud 42 and the inner shroud 30 and the position retaining device 60 are previously mounted in the nozzle 10.

In other words, the application of a prestress is obtained by mounting the vane assembly 20 between, on the one hand, the outer shroud 42 on an outer part of the blade assembly 20, and on the other hand the inner shroud 30 on an inner part of the vane assembly 20, and the position retaining device 60.

Therefore, between an «at rest» or non-stressed state corresponding to the position retaining device 60 illustrated alone in FIGS. 5A and 5B, and an elastically prestressed state, a force is applied onto the position retaining device 60.

FIGS. 5C, 5D, 5E, 5F and 5G give schematic cross-sectional views of alternative position retaining devices 60.

In the embodiments in FIGS. 5C to 5G, only the structure of the position retaining devices 60 varies, the other characteristics of the nozzle 10 being similar to the embodiments in FIGS. 1 to 5B and are not repeated.

Figure 5C:
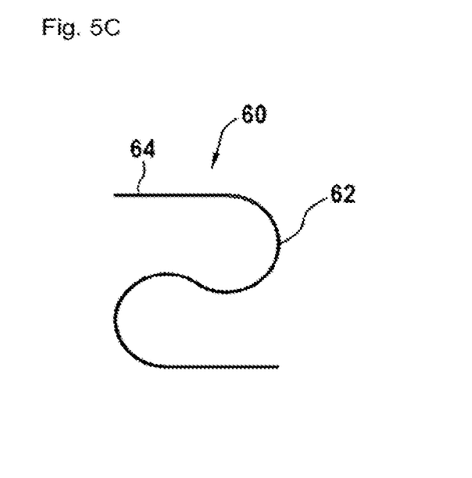
FIGS. 5C to 5G are schematic cross-sectional views of alternative position retaining devices.
Figure 5D:
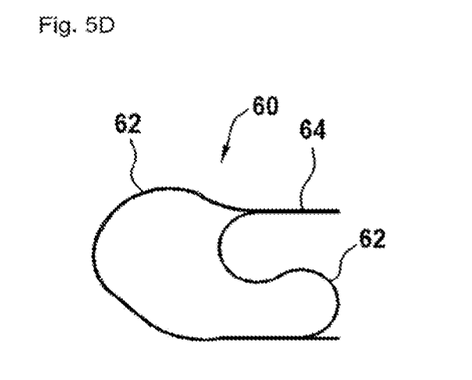
Figure 5E:
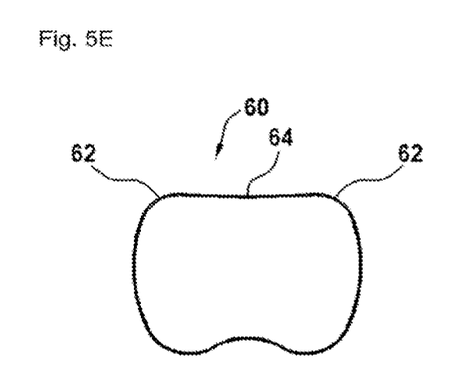
Figure 5F:
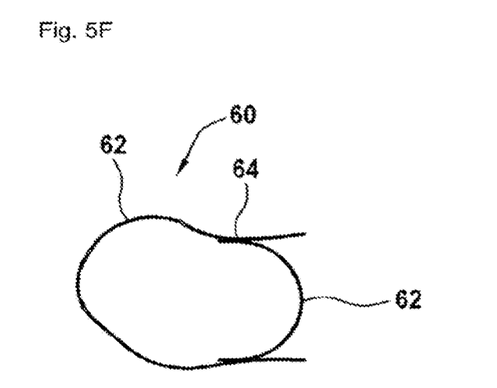
Figure 5G:
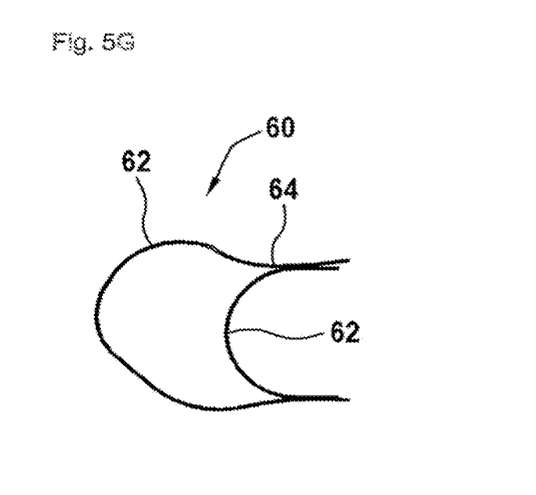

In particular, a metal sheet 62 can have a curvature with changing orientation as illustrated in FIGS. 5C and 5D. One metal sheet 62 can also be interlocked with another metal sheet 62 as illustrated in FIG. 5B, 5D, or 5G, or two metal sheets 62 can only be partially interlocked at a contact zone 64 as illustrated in FIG. 5E or 5F.

It will be understood that any combination of curvature or interlocking can be considered to ensure the applying of a force allowing the vane assembly to be held in position.

Figure 6A:
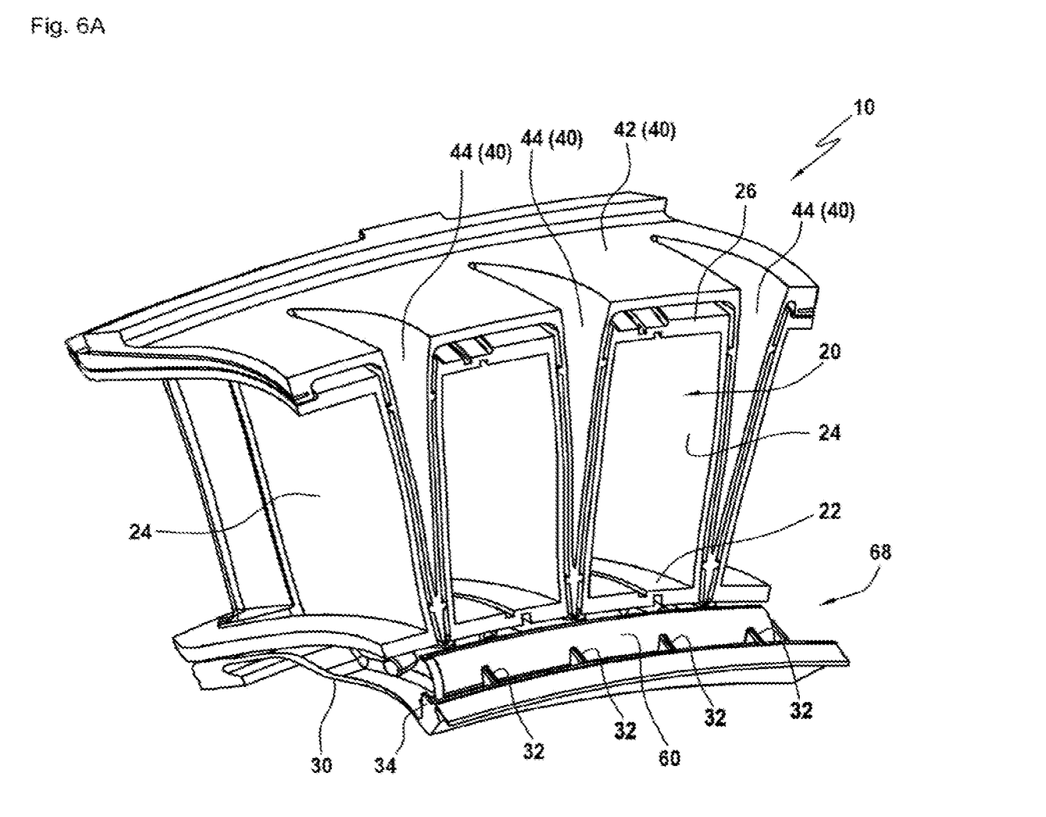
FIG. 6A is a schematic cut-away perspective view of a turbine nozzle comprising a position retaining ring according to a first embodiment.
Figure 6B:
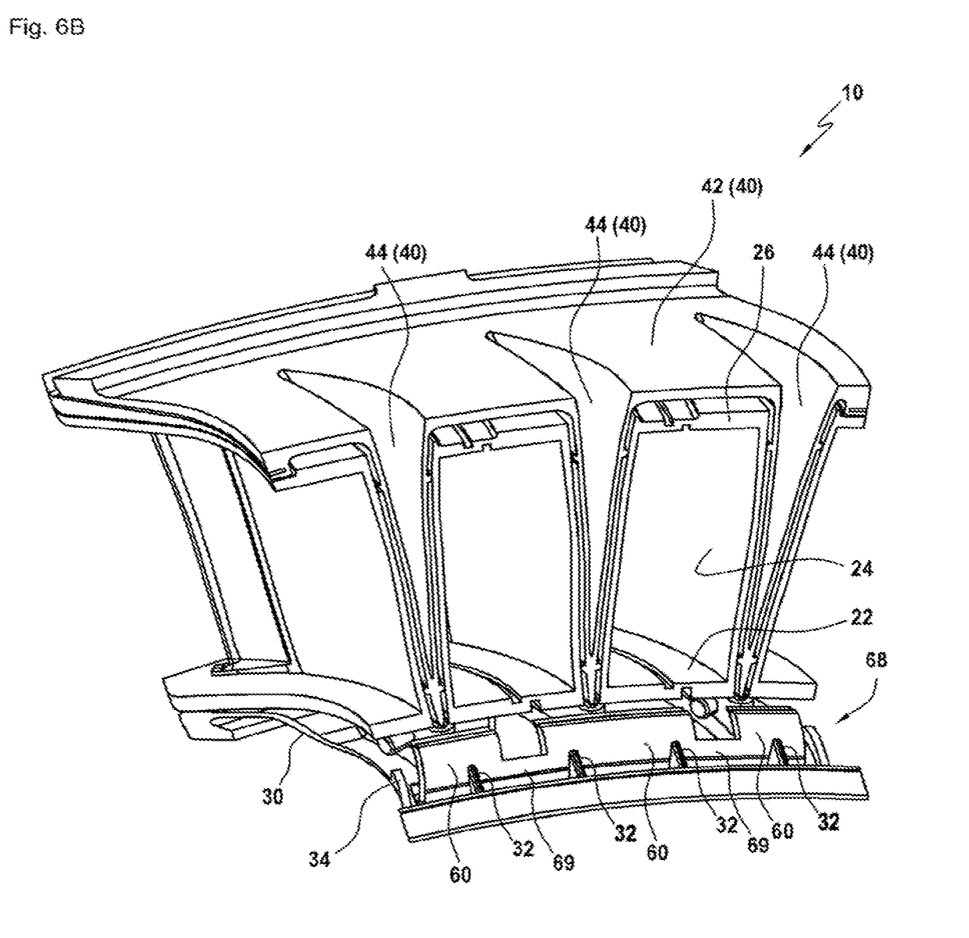
FIG. 6B is a schematic cut-away perspective view of a turbine nozzle comprising a position retaining ring according to a second embodiment.

FIGS. 6A and 6B give two schematic views of a turbine nozzle 10 comprising position retaining rings according to the first and second embodiments respectively, wherein an outer part of the nozzle 10 comprising the vane assembly 20, the outer shroud 42 and the radial strut 44 are shown in cross-section.

The embodiments in FIGS. 6A and 6B are compatible with the illustration in FIGS. 1 to 5G and the common elements will not be further described.

The views in FIGS. 6A and 6B illustrate the extending of a radial strut 44 between the outer shroud 42 and the inner shroud 30 through the hollow vanes 24.

The embodiments in FIGS. 6A and 6B differ in the structure of a position retaining ring 68.

In the first embodiment of a position retaining ring 68 in FIG. 6A, a position retaining ring 68 is formed from one or more position retaining devices.

The position retaining ring 68 can be formed of a plurality of independent position retaining elements arranged on a circumferential contour of the nozzle 10.

The axial positioning of these position retaining devices is ensured by protrusions 32 intended to bear upon the position retaining device 60 in an at least axial direction i.e. having a nonzero axial component.

The tangential positioning of these position retaining devices is ensured by protrusions 34 intended to bear upon on the position retaining device 60 in an at least tangential direction i.e. having a nonzero tangential component.

The position retaining ring 68 can also be formed of a single position retaining device 60 formed on the entire circumferential contour of the nozzle 10.

In the second embodiment of a position retaining ring 68 in FIG. 6B, a position holding ring 68 is formed from a plurality of position retaining devices circumferentially connected by one or more connectors 69.

Therefore, the positions of the position retaining devices can be provided to correspond with the circumferential positions of the vanes 24, and can therefore be arranged against each of the plurality of vanes 24. Said position retaining ring 68 is of lightweight structure.

The axial and tangential positioning of the position retaining devices of the ring is ensured by the protrusions 32, 34.

A metal sheet 62 of the position retaining device 60 can be designed in a nickel-based alloy. It will be understood however that the general principle of the position retaining device 60 is not limited to said family of materials.

Although the present invention has been described with reference to specific examples of embodiment, modifications can evidently be made to these examples without departing from the general scope of the invention such as defined in the claims. In particular, individual characteristics of the different illustrated/mentioned embodiments can be combined in additional embodiments. The description and drawings are therefore to be construed as being illustrative rather than restrictive.

In particular, the present invention has been described with reference to a nozzle 10 in CMC, but it will be understood that the general principle of retaining a vane assembly 20 in position in a nozzle 10 is not limited to the use of a CMC material.

The invention claimed is:

1. A turbine engine nozzle extending about an axis and comprising:
    a vane assembly mounted between an outer shroud and an inner shroud, and
    a position retaining device configured to be placed in an elastically prestressed state between the inner shroud and an inner platform of the vane assembly to apply a stress onto the vane assembly oriented towards the outer shroud,
    wherein contact between the inner shroud and the inner platform is obtained by one same surface of the position retaining device, and
    wherein the position retaining device comprises two curved metal sheets having common ends.

2. The nozzle according to claim 1, wherein one of the two metal sheets is interlocked in the other of the two metal sheets.

3. The nozzle according to claim 1, wherein prestressing is performed for a compression corresponding to a displacement of between 0.2 mm and 1 mm between a state of rest and the elastically prestressed state.

4. The nozzle according to claim 1, wherein prestressing is obtained by mounting the vane assembly on the position retaining device between the outer shroud and the inner shroud.

5. The nozzle according to claim 4, wherein the vane assembly comprises at least one hollow vane to allow the passing of a radial strut securing the inner shroud to the outer shroud.

6. The nozzle according to claim 5, comprising at least two position retaining devices circumferentially connected and each arranged against at least one vane.

7. The nozzle according to claim 4, wherein the inner shroud has a clamping protrusion configured to limit displacement of the position retaining device in a circumferential direction of the nozzle.

8. The nozzle according to claim 1, wherein the vane assembly is in ceramic matrix composite.

9. A turbine engine comprising the nozzle according to claim 1.

10. A turbine engine nozzle extending about an axis and comprising:
    a vane assembly mounted between an outer shroud and an inner shroud, and
    a position retaining device configured to be placed in an elastically prestressed state between the inner shroud and an inner platform of the vane assembly to apply a stress onto the vane assembly oriented towards the outer shroud,
    wherein contact between the inner shroud and the inner platform is obtained by one same surface of the position retaining device, and
    wherein prestressing is performed for a compression corresponding to a displacement of between 0.2 mm and 1 mm between a state of rest and the elastically prestressed state.

11. A turbine engine comprising the nozzle according to claim 10.

12. A turbine engine nozzle extending about an axis and comprising:
   a vane assembly mounted between an outer shroud and an inner shroud, and
   a position retaining device configured to be placed in an elastically prestressed state between the inner shroud and an inner platform of the vane assembly to apply a stress onto the vane assembly oriented towards the outer shroud,
   wherein contact between the inner shroud and the inner platform is obtained by one same surface of the position retaining device,
   wherein the vane assembly comprises at least one hollow vane to allow the passing of a radial strut securing the inner shroud to the outer shroud, and
   wherein the nozzle further comprises at least two position retaining devices circumferentially connected and each arranged against at least one vane.

13. A turbine engine comprising the nozzle according to claim 12.

14. A turbine engine nozzle extending about an axis and comprising:
   a vane assembly mounted between an outer shroud and an inner shroud, and
   a position retaining device configured to be placed in an elastically prestressed state between the inner shroud and an inner platform of the vane assembly to apply a stress onto the vane assembly oriented towards the outer shroud,
   wherein contact between the inner shroud and the inner platform is obtained by one same surface of the position retaining device,
   wherein the position retaining device comprises at least one curved metal sheet presenting a C-shape,
   wherein a first end of the at least one curved metal sheet corresponds to a first contact zone between the position retaining device and the inner platform of the vane assembly when the position retaining device is mounted in the nozzle, and
   wherein a second end of the at least one curved metal sheet corresponds to a second contact zone between the position retaining device and the inner shroud when the position retaining device is mounted in the nozzle.

* * * * *